United States Patent [19]
Cook

[11] 3,765,591
[45] Oct. 16, 1973

[54] WAVE SOLDERING ELECTRICAL CONNECTIONS

[75] Inventor: Lawrence E. Cook, Meriden, Conn.

[73] Assignee: Dynamics Corporation of America, New York, N.Y.

[22] Filed: Jan. 19, 1972

[21] Appl. No.: 219,036

Related U.S. Application Data

[63] Continuation-in-part of Ser. No. 138,651, April 29, 1971, abandoned.

[52] U.S. Cl. ............... 228/36, 29/471.1, 29/503, 117/114, 118/400, 228/37, 228/40
[51] Int. Cl. ............................................. B23k 1/08
[58] Field of Search .................. 228/36, 37, 39, 40, 228/31; 29/471.1, 503, 484; 118/259, 400, 423; 117/113, 114

[56] References Cited
UNITED STATES PATENTS

| | | | |
|---|---|---|---|
| 1,478,696 | 12/1923 | Boehme | 228/31 |
| 2,776,640 | 1/1957 | Miklofsky et al. | 228/36 X |
| 3,482,755 | 12/1969 | Raciti | 228/37 X |
| 3,536,243 | 10/1970 | Higgins | 228/36 X |
| 3,589,590 | 6/1971 | Fitzsimmons | 29/503 X |

*Primary Examiner*—J. Spencer Overholser
*Assistant Examiner*—Robert J. Craig
*Attorney*—Watson D. Harbaugh et al.

[57] ABSTRACT

Wire connectors are wave soldered to a terminal by moving mechanically connected insulated wire and depending terminal connectors in a fixed plane progressively through a flux bath and then through a bidirectionally flowing molten solder bath for a time-heat cycle effective to burn off the insulation and solder bond the elements. The work pieces may be moved in a circular path or moved along a guiding divider which shields the remaining parts of the work piece from flux splatter in a clean cooling dispersing atmosphere or a blast of cooling air may be used to scavenge and return to the bath surplus molten solder from the soldered elements as they leave the bath.

13 Claims, 10 Drawing Figures

PATENTED OCT 16 1973 3,765,591
SHEET 1 OF 3
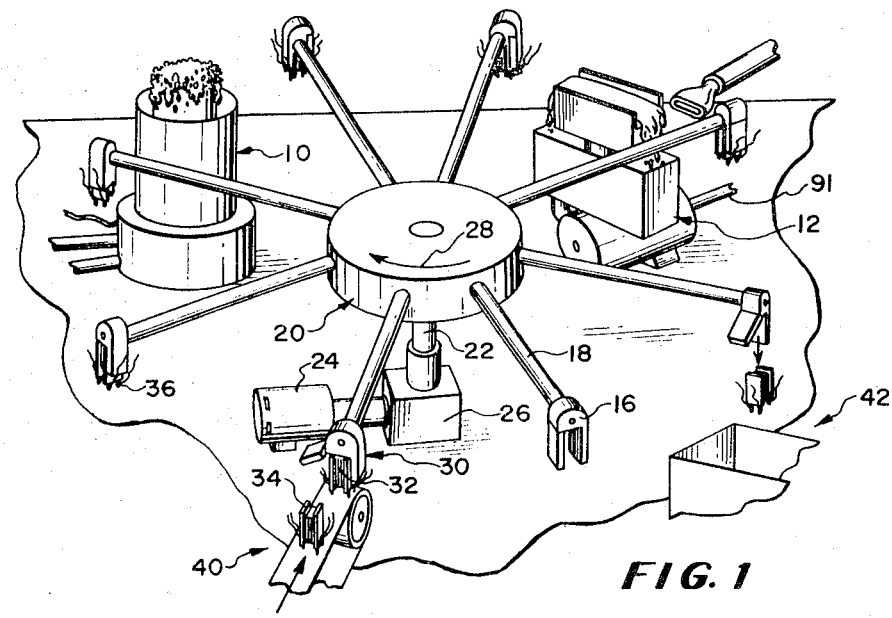
FIG. 1
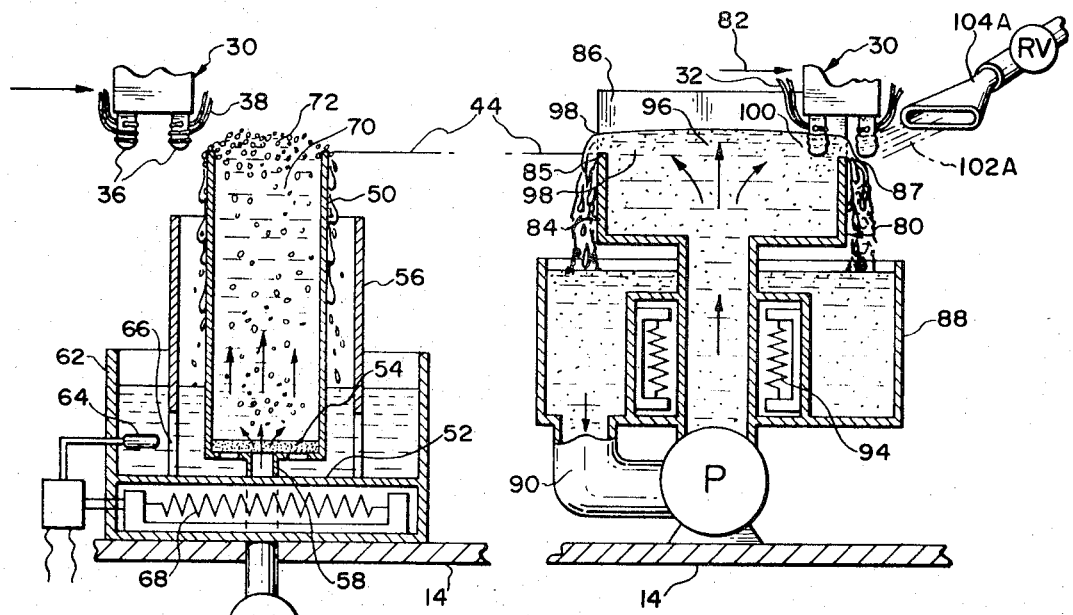
FIG. 2
FIG. 3

PATENTED OCT 16 1973 3,765,591
SHEET 2 OF 3
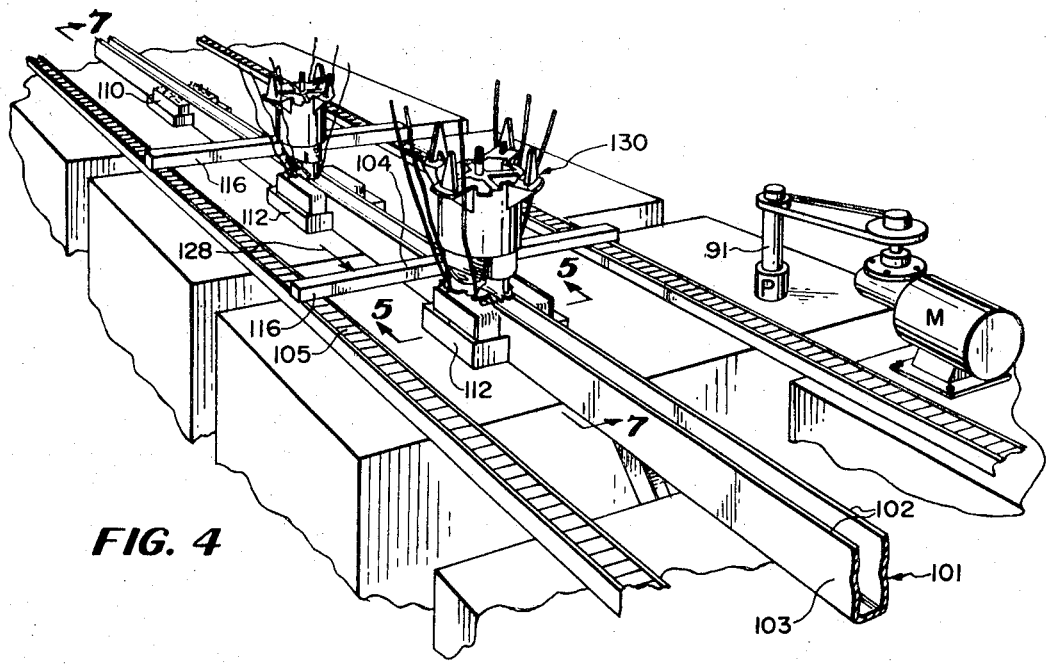
FIG. 4
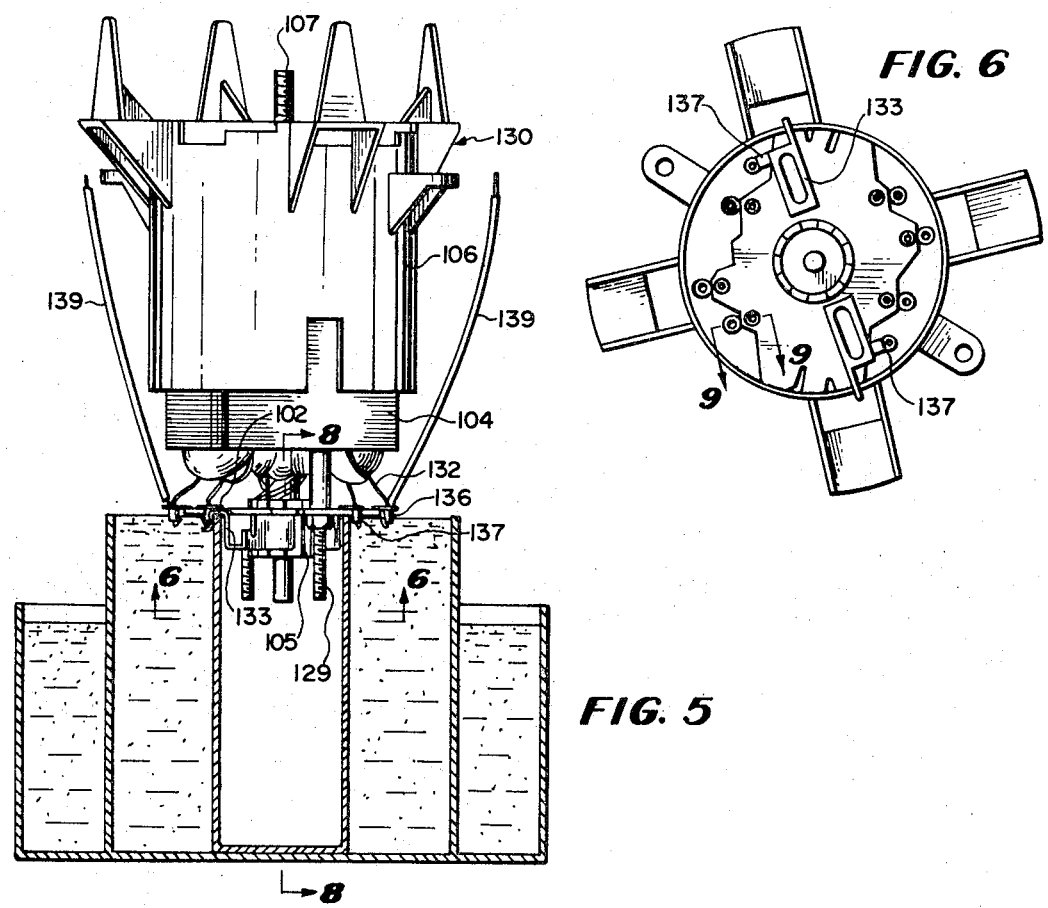
FIG. 5
FIG. 6

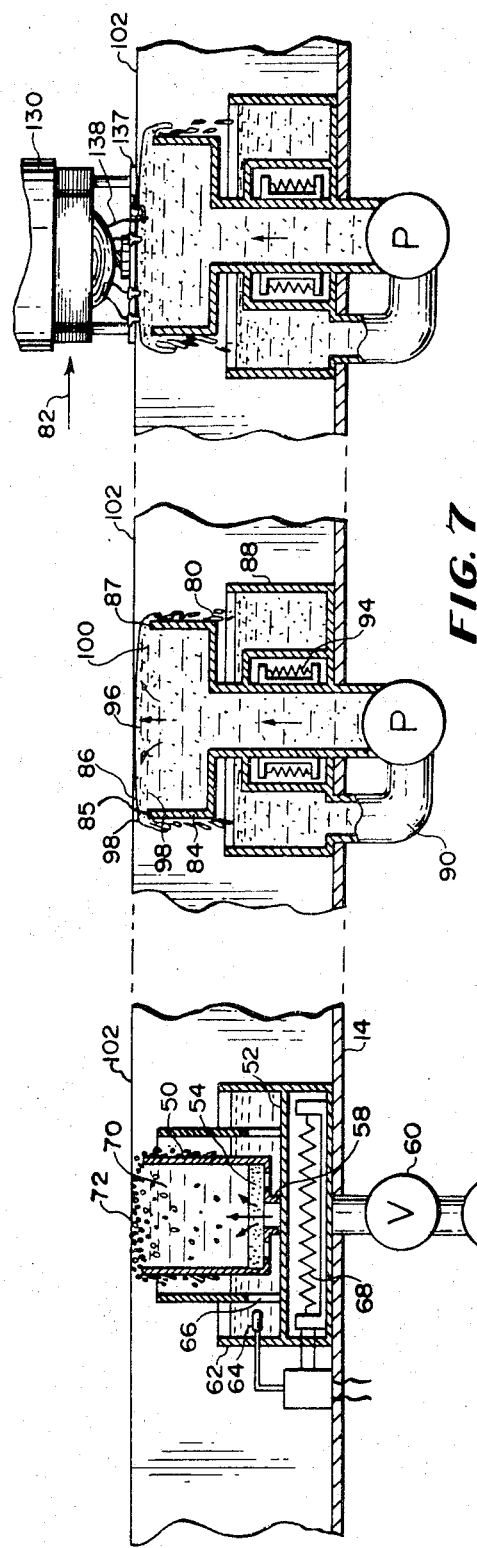
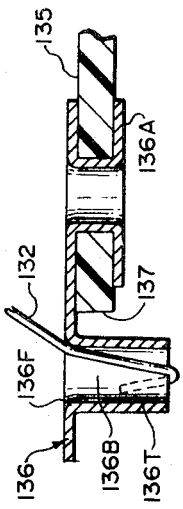
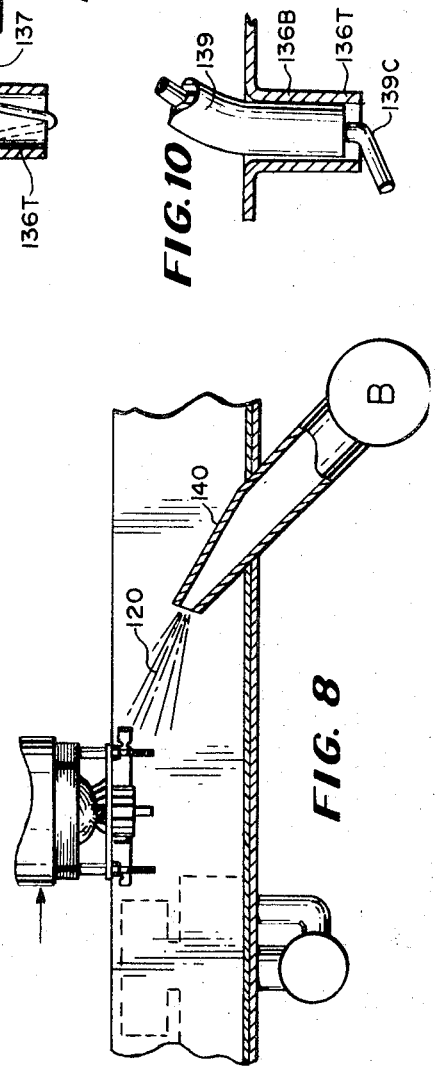
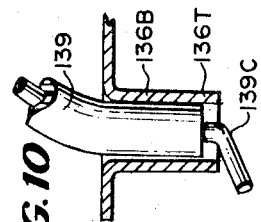

WAVE SOLDERING ELECTRICAL CONNECTIONS

RELATED APPLICATION

This application is a continuation-in-part application of application Ser. No. 138,651, filed by the same inventor, Apr. 29, 1971 now abandoned.

BACKGROUND OF THE INVENTION

Heretofore electrical connections have been soldered under conveyor conditions in which relative vertical movement has been required between a work piece and molten solder to dispose the solder and the work piece in a proper dip relation. A preheating of the work piece has generally been employed ahead of a solder dip to bring bare uninsulated metal parts up to predetermined temperatures. Where relatively moving molten solder has been employed as a dip the flow is restricted to a small exposed area and must have a mild upward component of movement of solder generally towards the connection whereby solder cannot contact the work piece other than the metal parts to be soldered. Even then care must be taken to prevent over-spread and the undesirable contacting of other parts. Conveyors are usually momentarily stopped, or make a quick vertical excursion for an adequate dipping operation to provide a soldered joint.

SUMMARY OF THE INVENTION

The present invention is characterized by a molten solder pot that is elongated in the direction of planar movement of a continuous conveyor which preferably is either a turning wheel having work carriers at the ends of spokes where work pieces are carried by a fixture, or, an endless conveyor along a rectilineal track as closely grouped as desirable where the work pieces have carriage parts below the level of which the solder joints depend.

Thermostatically controlled heated solder is moved at a substantially high rate from the heater upwardly at the horizontal center of the pot to establish the hottest point of the solder preferably at the horizontal center of the pot. From there the flow preferably divides itself into two currents continuously flowing substantial distances in opposite directions essentially in alignment with the path of movement of the work piece on the conveyor. The two currents spill over weirs at the opposite ends of the pot at a depth and with agitation great enough: (1) to heat the mechanically secured parts; (2) burn the insulation from any insulated wire ends; (3) solder bond the two parts; (4) solidly interconnect wire ends with solder in small apertures of thin wall terminals; and (5) wash away dross and debris to keep the surface of the solder substantially clean since there are no corners in which dross can collect.

The current of solder flowing in one direction flows towards the approaching work pieces and rapidly heats each successive work piece regardless of their frequency with increasingly hotter molten solder until the center of the pot is reached where the hottest portion of solder burns away the flux coated insulation to bare clean metal for direct contact by the flux without contamination by dross or air. The flux required to bond the solder to the clean metal stripped of insulation in the bath is very little and enough flux for that purpose preferably is supplied by a preliminary light bubble-bath of low viscosity.

With the solder flowing in the opposite direction from the center of the pot, the work piece moves with it and retains sufficient solder to hold the wires solidly and rigidly in place. In one embodiment where the terminal is made of substantial thickness of metal having high electrical conductivity an air blast, which in operation happens to have a cooling effect upon the work piece and the solder bath, is employed to scavenge the excess molten solder from the work pieces as they leave the exit spillway. The air blows the scavenged excess back into the body of the spillage. The remaining bonding solder is quickly hardened before undesirable temperatures can be built up in the remaining structure of the work piece. Thus the blast of air operates in part to keep down the temperature of the remaining structure of the work piece while the electrical joint is being soldered and then scavenges and chills it. Where depending work piece parts may be contacted by flux fumes or splatter they are shielded and subjected to a moving clean atmosphere which disperses fumes and splatter.

Mechanical surface skimmers can be carried by the conveyor to keep the surface of the solder bright and clean throughout its exposed area, but it has been found that the high volume flow that is adequate to raise the solder level well above the weirs as much as one-half inch, along with the movement of the work piece itself, provides an action that is generally enough to keep the surface of the solder adequately clean.

The invention is characterized by eliminating the need for a conventional preheat flame ahead of or between a fluxing station and the soldering station, and, along therewith also eliminates an extra expense for prestripping the connector wire of insulation for use at the connector joint.

A further object of the invention is to eliminate all mechanisms and operations requiring relative vertical movement between the solder pot and the work piece whereby speed and cooperation are accomplished with continuous conveyor movement preferably in a single horizontal plane, and preferably with a simplified apparatus whose only movable parts are essentially a turntable with fixtures for loading and unloading work pieces at a single station or a track along which loose work pieces are moved, a hot solder pump, means for providing enough air for a shield or scavenging blast or both, and low pressure air for the flux bubbler, all of which once adjusted and running requires little if any further attention.

A further object of the invention is to provide currents in a solder pot that are fast flowing in opposite directions from the center in which the unindirectional conveyance of the work piece has hot solder flowing towards it to increase the effective heat supply and exchange contact therebetween while heating up the work piece and assuring the burning of the insulation as it passes through the upward flowing stream of hottest solder. Thereafter the work piece is moved downstream with the opposite current towards the cooling air blast which scavenges excess solder back into the spillage as the work piece leaves the solder and before the soldered joint hardens, and may be passed rapidly through more than one solder bath to assure adequate soldering without unduly heating the remainder of the work piece parts.

Various other and further objects and advantages will appear from the description and claims which follow as related to the drawings in which:

FIG. 1 is a perspective of the complete soldering machine embodying the invention;

FIG. 2 is a diagrammatical illustration of the fluxing device and movement of the work piece with respect thereto; and FIG. 3 is a diagrammatical illustration of the solder pot illustrating the operation and flow of the solder and air blast in the invention;

FIG. 4 is a perspective view of another embodiment of the invention involving a rectilineal feed with work pieces moved along guide tracks that support and shield the uninvolved piece parts;

FIG. 5 is a section taken on line 5—5 in FIG. 4;

FIG. 6 is a section taken on line 6—6 in FIG. 5;

FIG. 7 is a longitudinal section taken on line 7—7 in FIG. 4 at one side of the work piece guide;

FIG. 8 is a longitudinal section similar to FIG. 7 but taken between the tracks of the guide;

FIG. 9 is a section taken on line 9 of FIG. 6 showing a bare wire connection; and FIG. 10 is a view similar to FIG. 9 showing an insulated wire make up with an eyelet connector.

DESCRIPTION OF PREFERRED EMBODIMENT

As shown in FIG. 1, the invention contemplates fluxing and soldering electrically conductive work pieces rotatively at successive stations indicated by the devices at 10 and 12, respectively. The devices are mounted on a work table 14 and are arranged preferably in a circular path that is transcribed by coplanar fixtures 16 carrying the work. The fixtures are located on the end of the spokes 18 of a turntable wheel 20 supported on a vertical shaft 22 that is rotated in the direction of the arrow 28 by the motor 24 through the transmission 26 as later described herein. In event that more than one work piece 30 are at soldering stations at one time, a rectilineally moving conveyor may be employed to provide a heat-time constant for all work pieces.

The work pieces 30 that are carried by the fixtures are illustrated by an assembled component of universal motors in which insulated magnet wire 32 is wound in place between dielectric end members 34 that carry connector terminals 36 along their lower peripheral edges about which the field-tap wire-loops 38 are quickly tied mechanically during the winding operation without need for stripping their plastic insulation.

The work pieces are secured to the fixtures with the lugs depending and disposed in a common plane to move successively from the feed station at 40 horizontally through the flux device 10 and then through the soldering station 12 to the piece discharge station 42 to solder the loops 38 to the lugs 36 in electrical conductive relation.

The work clearance levels of the two devices 10 and 12 as indicated at 44 are substantially the same so that the planar movement of the coplanar work pieces is devoid of any vertical excursions. Thus embodiments of the invention are greatly simplified.

The liquid flux and molten solder components being amenable to the passage of solid objects through them, their working levels are raised above the level 44 quite substantially for the tied wire loops 38 and the terminals 36 to freely pass therethrough and be coated thereby.

FLUXING STATION

For this purpose the fluxing device 10 illustrated in the embodiment shown comprises a central container 50 extending to the level 44 and having replenishing holes 52 in the bottom covered by a sintered metal porous disk 54. An overflow catch basin 56 surrounds the container 50 and the holes 52 permit the liquid levels to seek to equalize in the container and basin.

A flux reservoir 62 surrounds the bottom of the basin 56 where soldering flux having a vaporizing temperature higher than that of the wire insulation is heated by an electric heater 68 to a constant liquid viscosity as controlled by an adjustable thermostat 64. The bottom of the basin is in communication with the reservoir through openings 66, and with the container 50 through openings 52.

A source of air under pressure is introduced to the container 50 by the conduit 58 as controlled by a flow adjustment valve 60 and a porous disk 54, preferably made of sintered powder stainless steel or bronze, is located in the bottom of the central container 50 over the openings 52 and conduit 58. The disk is preferably provided with 25 micron openings and with the replenishing flux moving therethrough along with the air, the comminuted air operates to convert the liquid flux in contact therewith into foam indicated at 70 in the central chamber 50 above the disk as both are broken up into minute units. The air present levitates the foam bodily.

An advantage of the embodiment illustrated arises by being able to provide an optimum coating and to minimize the dross which will occur at the solder station. Given equal liquid levels, preferably low, in the relationship described, the minute air bubbles leaving the disk at the start will foam the flux above it to a predetermined height but the weight of the foam column is still substantially the same as though liquid levels were present even though the foam xtends well above the liquid level. This may be high enough to bathe the wire terminals. However, if the liquid present between air particles is more viscous and cooler the level of the foam would be heavier yet and may not be high enough to extend above the level 44 of the container. Continued air flow and lack of flux could cause dry bubbling that could create an air cavity raising the foam above it higher and continuing to prevent replenishing liquid flux flow, resulting in irregular fluxing conditions. On the other hand, an air bubbler covered at all times with liquid flux tends to produce coarse bubbles with thick walls between bubbles that provide on the work pieces an excess of flux that is unnecessary and ultimately becomes objectionable dross.

However, with the present invention the flux is brought to and kept at a predetermined temperature so that its viscosity with respect to the disk is constant and any replenishing flux needed is preferably received through the disk along with the minute air bubbles. Such maintains foam continuity of the column and the central portion is easily forced above the level 44 a substantial distance as at 72 before the marginal portions spill over the edge at the level 44. Accordingly, additional air can be supplied and additional liquid flux would be supplied at the same time to prevent minute units of air from recollecting without enough liquid flux to hold a foam. Thereby the effect of substantial variations in the tube height above liquid flux replenishing level are overcome including pressure changes of the air and any special care required to maintain the upward bulge of the foam at 72 to flux contacts 36 passing therethrough. Only the temperature of the flux and the setting of the air valve is involved in the present invention to assure a continuing desired height of the foam bulge 72 above the level 44 to attain maximum results with minimum waste of flux.

SOLDERING STATION

At the soldering station 12, or stations, a long and narrow solder applicator trough 80 of a height greater than the level 44 is provided that is elongated in the direction of the arrow 82. The end walls 84 are cut down to the level 44 for the top edges thereof to form weirs 85 and 87. The upper portion of the side walls then form retaining walls 86 confining solder overflow to the weirs. The trough is received in an overflow tank 88 and a drain 90 therefrom leads to the inlet of a large capacity pump P driven by a speed controlled shaft 91 (FIG. 4). The outlet 92 of the pump extends through a thermostatically controlled electric heater 94 in heat exchange relationship therewith and terminates in an upwardly directing opening located approximately in the center of the trough 80 and well below the level 44. The pump is driven at a speed to supply hot solder in sufficient quantity to provide a spillage of solder over the weirs of a height as much as five-eighths inch. Thus the heated solder welling up at the center 96 of the trough divides to flow in opposite directions over the weirs.

As the connector terminals 36 with the insulated wires thereon enter the solder over the weir 85 and move upstream of the current 98 fresh hot solder is brought into heat exchange with the terminals and rapidly heats them. By the time the center 96 is reached the wire insulation is vaporized off of the wire with nonvaporizing flux replacing the insulation in contact with the bare wire ends. As the connector terminals move from the center in the direction of the other of the two currents, as indicated at 100, the solder spreads in bonding contact with the fluxed bare metal of the wire and connectors as timed to occur just before they pass over the other weir 87. At this time a blast of air 102A from a nozzle 104A is directed against the metal parts and the solder that is spilling over the weir 87. This blast cools the supporting parts of the connections and when the connections leave the solder, any surplus molten solder clinging thereto is driven back into the spillage for reheating and recycling. The solder remaining that economically coats the connection is frozen for solidification and immediate use or packaging of the work piece.

As shown in FIG. 4 the invention further contemplates rectilineal movement of the work pieces 130 along the edges 102 of a U-shaped channel 101 serving as tracks to conduct them through station 110 for fluxing, and one or more stations 112 for soldering, as propelled therealong in the direction of the arrow 128 by push rods 116 secured to endless chains 105. The endless chains can return below or above the equipment illustrated. If below, one chain can be used and diverges from the channel where the rods 116 relinquished the work pieces.

The work pieces 130 shown that are carried by the tracks 102 are illustrated as stator and armature elements 104 and 105, respectively, of an electric motor assembled in a housing 106 which journals the armature at its upper driving end 107 and carries a dielectric mounting plate 135 at the lower commutator end, upon which brush holders 133 and connectors 136 are mounted as held in place by assembly screws 129.

As viewed in FIGS. 9 and 10 each connector 136 comprises a pair of connected sleeve rivets with one rivet portion 136A riveted to the insulation plate at its edge as at 137 and the other rivet portion 136B having its tubular portion 136T extending downwardly below the plate 135. The extensions 136T receive coil leads 138 and wire connectors 139 that are terminally inserted and soldered therein. The flared upper end of the tubular portion 136T serves as a funnel 136F fuiding the ends of the wires as they are inserted in place and the wires are either terminally bent or wrapped around the eyelet. The ends of the magnet coil wires 132, as shown in FIG. 9, have an insulation coating and the heavier lead wires shown in FIG. 10 are terminally stripped bare of insulation and crooked as at 139C to hold their inserted position until they are soldered in place. The rivets receive either one or both wires for a soldered electrical junction and along with the rivets, the brush holders 133 have downwardly bent eyeletted tabs 137 which extend below the level of the mounting board 135, it being noted that they connect with the brush holders at the level of the mounting board 135 as seen in FIGS. 6 and 7.

Referring to FIG. 6, two parallel broken lines 139 are shown to indicate paths on the mounting plate 135 which will accommodate the tracks 102 when the work piece 130 is placed thereon as shown in FIG. 4. Thus, as shown in FIGS. 5, 7 and 8, the armature, assembly screws 129, and brush holders 133 which extend below the mounting plate are received protectively between the side walls 103 of the channel member 101 while the depending connector elements 137 and 136T are disposed outside of the channel side walls 103 where they will pass through the flux foam 70 and the currents 98 and 100 of the flowing solder flowing above the level of the weirs 87.

In this embodiment, structure and operation are simplified by the channel 101 extending through the solder pots 12 with the walls 103 thereof providing the spaced retaining walls 186 extending through the center of the pots and the retaining side walls 86 serving as outside walls disposed at a height equal to that of the tracks 102.

Although the use of two soldering pots increases the number of piece parts processed by moving them faster, it has been found that with the sleeve rivets, the first soldering operation removes wire insulation, fluxes the bared metal and "wets" the sleeves and the bared wires with a coat of solder. With the second soldering operation, additional solder is deposited with the wetting solder to close the eyelet openings with an economical cross wall of solder which holds the wires solidly in place and provides a substantial electrical conductivity through solder between the wires substantially without reliance on the metal of the eyelet. Thereby juncture conductively is consistently high throughout the circuits with easily handled rivets having thin walls or tinned alloys whose circular shape contributes to strength in the assembly of the motor unit.

Referring to FIG. 8, it is to be noted that the depth of the channel 101 accomodates in a protective way a wide miscellany of lengths of depending non-soldered elements on work pieces. However, since the level of the solder is quite close to that of the tracks 102, it is desirable to avoid any flux or solder fumes and splatter contaminating important elements such as the commutator 105 and brush holder 133 where contact conductivity with brushes is important. A blower B is therefore utilized having a nozzle 140 which provides for an inflow of air at 120 in the channel under sufficient pressure to rise and flow outwardly to disperse any fumes or splatter harmlessly away from the non-soldered parts where the work pieces are passing through a critical zone such as that associated with the first solder pot following the fluxing of the work pieces.

CONSIDERATION

By way of example involving work pieces shown, and not by way of limitation, the distance between weirs is approximately 3 inches; the depth of the spillage is approximately one-half inch which will accommodate terminal connectors of a wide range of heights; the total time of immersion of the connectors is approximately 0.07 minutes thereby providing some tolerance that safeguards conductor wires from being damaged; the air blast is heavy enough to blow excess solder off before it is cooled and enough air strikes the connectors exposed above the level of the molten solder to "freeze" the solder; the vapor dispersing air also cools depending parts (FIG. 5) which receive heat radiated from the walls of the conveyor channel 101; the temperature of the molten solder engaging the connectors is approximately 750° F; The insulation of the copper wire has the characteristics associated with an inner coating of polyurethane with an outer jacket of nylon both of which are essentially vaporized at 750° F leaving only a byproduct that tends to clean or brighten the molten solder as distinguished from contaminating it.

As mentioned, the comminuting disk 54 is preferably of stainless steel or bronze because these metals wash clean as the flux and air passes therethrough. Since the flux application is in an above room temperature environment that varies a great deal depending on air circulation designed to protect workers, it is preferred to heat the flux to a freely flowable condition at constant temperature rather than thin the flux with a liquid that vaporizes with heat. Vaporization not only would thicken but also chills the remainder with the latent heat of vaporization depletion.

The porosity of the disk 54 is approximately 25 microns and although the air passing through it is comminuted to minute bubbles, the presence of flux in the body of the disk, and preferably moving with the air, has the advantage of initiating a fine foam at the exit surface of the disk. The thickness of the disk is between one-eighth inch and one-fourth inch; the air inlet area therefor is three-fourths inch and the applied air pressure is filtered and regulated to less than 1 p.s.i. with a valve controlling the flow. The remaining upstream area of the disk is exposed to flux under a mild hydraulic pressure so that with such pressure and capillary action the flux flows to wet the downstream area of the disk. As the bubbles leave that area, they replace foam that has been depleted by the work pieces or by overflow. The adjustments of flux temperature and air pressure, once set, provide a constancy of performance that is free of normal variations in the hydraulic level of flux during flux depletion and replenishment.

Thus a temperature-time relation can be employed to burn away flux coated wire insulation and solder the bared wire without any contamination of an excellent, electrically conductive wire-terminal joint.

Although the viscosity of the flux can be controlled by dilution, reliance on this alone is not as satisfactory as controlling heat. However, heat and dilution can supplement one another to stabilize temperature in an environment where environmental heat-up, cool-off and drafts can cause appreciable changes with a hot soldering pot in close proximity.

Having described preferred embodiments of the invention it will be seen how various arrangements and modifications including devices that have a minimum of adjustable controls can be made without departing from the spirit and scope of the invention.

What is claimed is:

1. A soldering apparatus comprising a continuously running conveyor defining a planar path of movement for its work supporting fixtures for movement thereof successively through a plurality of stations,
    means for applying flux to workpieces carried by said fixtures past a flux station,
    an elongated molten solder applicator trough with its major dimension aligned with said path of movement and having an inlet opening, portions of the end walls of the trough in said path being of substantially shorter height than the side walls to provide weirs over which molten solder in the trough above the level of the weirs may flow horizontally in opposite directions and overflow from the trough with a substantial depth,
    means connected to said inlet opening collecting said overflow, heating it and forcing it back to said trough through said inlet opening for reflow over both weirs, said solder being heated hot enough to burn insulation from insulated transformer wire, and
    means for supplying and directing a blast of air towards one of the overflows to scavenge solder from a workpiece leaving said one of the overflows.

2. The combination of claim 1 in which the weirs have approximately the same level and open in opposite directions in alignment with the path of movement.

3. The combination of claim 1 in which the the trough is long and narrow with the weirs at the ends thereof and said collecting means includes a tank, a heater, and pump to supply molten solder through said inlet opening at a rate to maintain the level of the solder in the trough at a level intermediate the tops of the weirs and side walls.

4. A soldering apparatus comprising a continuously running conveyor defining a planar path of movement for its work supporting fixtures for movement thereof successively through a plurality of stations,
    means for applying flux to workpieces carried by said fixtures past a flux station,
    an elongated molten solder applicator trough with its major dimension aligned with said path of movement and having an inlet opening, portions of the end walls of the trough being of substantially shorter height than the side walls to provide weirs over which molten solder in the trough above the level of the weirs may overflow from the trough with a substantial depth,
    means connected to said inlet opening collecting said overflow, heating it and forcing it back to said trough through said inlet opening for reflow over both weirs, said solder being heated hot enough to burn insulation from insulated transformer wire, and means for supplying and directing a blast of air towards one of the overflows to scavenge solder from a workpiece leaving said one of the overflows, said conveyor comprising a circular wheel having work supporting holders thereon which pass over the top of said trough and workpieces carried by the fixtures clear said weirs with downwardly extending mechanically connected metal joints immersed in solder in said trough.

5. The combination of claim 1 in which said flux applying means comprises a flux foam producing device, the product of which extends above the level of said weirs.

6. A soldering apparatus comprising a continuously running conveyor means defining a planar path of movement for its workpieces for movement successively through a work station, and including a member having a track along its upper edge along which workpieces are moved, an elongated molten solder trough at said station having its major dimension aligned with said path of movement with said track extending along one side of the trough, for supporting body portions of the workpieces a spaced distance above solder in the trough throughout the length of the trough, portions of the end walls of the trough being of substantially shorter height than the side walls of the trough and the track to provide weirs over which depending connector terminals on the workpieces may contact the molten solder in the trough and pass above the level of the weirs along with the overflow of solder from the trough having a substantial depth, means collecting said overflow, heating it and forcing it back to said trough to a height appreciably less than that of said track for reflow over both weirs, intermittent air blower means supplying cooling air directed to the space above the solder between said body portions and solder level to scavenge and return to the overflow extra solder from connector terminals and cool body portions at said space as the connector terminals leave the solder over a weir.

7. A soldering apparatus comprising a trough of molten solder laterally moving at a predetermined level, conveyor means having a track for moving bodies of workpieces laterally above said predetermined level with depending wired connector portions thereon immersed and contacting said flowing molten solder below said level with the bodies of the work riding on said conveyor means, means for moving the molten solder vertically against depending ends of cylindrical thin wall rivets with exposed wire ends extending therethrough to assist internal application of solder thereto, said conveyor means removing said connectors from the flowing molten solder with a diminishing contact therewith to leave solder closing the lower end of said connectors embedding said wire ends in electrically conductive relation through the solder.

8. A soldering apparatus comprising a continuously running conveyor means defining a planar path of movement for carrying through a plurality of stations workpieces having depending elements some of which are electrical connector terminals thereon with the terminals at a predetermined constant level, means for applying flux to said connector terminals at one station including a container having side walls extending above said level along said path of movement, an elongated molten solder trough means at another station with its top above said level and having its major dimension and side walls aligned with said path of movement and with portions of its end walls in said path of movement being of substantially shorter height than its side walls to provide weirs over which said connector terminals pass and molten solder in the trough above the level of the weirs may contact said terminals and overflow from the trough at a substantial depth in opposite directions, and means collecting said overflow, heating it and forcing it back to said trough at its longitudinal center to a height contacting said connector terminals for repeat contact with workpieces and reflow over both weirs, and means at said stations including at least one of said side walls to shield the other of said depending elements below the level of said solder from flux fumes and solder.

9. The combination of claim 8 in which said shielding means has a track along its upper edge supporting said workpieces in their path of movement with respect to said predetermined level.

10. The combination of claim 8 in which said shielding means comprises a channel member extending between said weirs and having a height appreciably higher than the level of the solder flowing over the weirs to shield said other depending elements from the heat of the solder.

11. The combination of claim 8 in which said connector terminals are cylindrical thin wall rivets with their wiring extending therethrough to solidly interconnect bare wires with solder for direct conduction of current therethrough.

12. The combination of claim 10 including blower means moving air into said channel means to coal said other of said depending means while between said weirs.

13. The combination of claim 7 in which said work piece has an insulating mounting board with a perforation along its edge and said rivet is one of a pair of connected rivets, the other one of which extends through and is riveted in place in said perforation with said one depending therebelow.

* * * * *